United States Patent [19]
Mehta

[11] Patent Number: 5,782,296
[45] Date of Patent: Jul. 21, 1998

[54] AUTO-PROGRAMMABLE ELECTRONIC THERMOSTAT

[75] Inventor: Vinay Mehta, Germantown, Tenn.

[73] Assignee: Hunter Fan Company, Memphis, Tenn.

[21] Appl. No.: 665,206

[22] Filed: Jun. 14, 1996

[51] Int. Cl.$^6$ .............................. F23N 5/20; F25B 19/00
[52] U.S. Cl. ..................... 165/268; 236/46 R; 364/551
[58] Field of Search ........................ 62/231; 236/46 R; 165/268; 364/557

[56] References Cited

U.S. PATENT DOCUMENTS

| | | | |
|---|---|---|---|
| 4,206,872 | 6/1980 | Levine | 165/268 X |
| 4,298,946 | 11/1981 | Hartsell et al. | 364/557 |
| 4,308,991 | 1/1982 | Peinetti et al. | 236/46 R |
| 4,386,649 | 6/1983 | Hines et al. | 236/46 R |
| 4,388,692 | 6/1983 | Jones et al. | 364/557 |
| 4,621,336 | 11/1986 | Brown | 364/557 |
| 4,771,392 | 9/1988 | Hall | 364/557 |
| 5,294,047 | 3/1994 | Schwer et al. | 236/46 R |
| 5,329,991 | 7/1994 | Mehta et al. | 236/46 R X |

Primary Examiner—William E. Wayner
Attorney, Agent, or Firm—Baker, Donelson, Bearman & Caldwell

[57] ABSTRACT

The invention is a method for programming a programmable thermostat having a default program set and one or more pre-programmed program sets, wherein each pre-programmed program set has a plurality of times and a plurality of temperatures. The method includes the steps of selecting one of the plurality of pre-programmed program sets; programming the programmable thermostat with the times and temperatures of the selected pre-programmed program set; and altering the times and temperatures of the selected pre-programmed program set to create a tailored program set. An auto-programmable thermostat may include a first memory having a default program set which receives at least one of a plurality of pre-programmed program sets, wherein each pre-programmed program set includes a plurality of times and at least a plurality of temperatures. The thermostat also may have a plurality of alphanumeric identifiers, each identifier corresponding to one of the plurality of pre-programmed program sets; selection keys for selecting one of a plurality of the alphanumeric identifiers; a processor responsive to the selection keys for replacing the default program set on the first memory with the selected pre-programmed program set; and keys for altering the times and temperatures of the selected pre-programmed program set.

37 Claims, 7 Drawing Sheets

| (REMAINDER) ↓ / OFFSET → | OFFSET | 0 / +0 / 6.00 8.00 4.30 11.00 | 1 / +0.30 / 6.30 8.30 5.00 11.30 | 2 / +1.00 / 7.00 9.00 5.30 12.00 | 3 / -0.30 / 5.30 7.30 4.00 10.30 | 4 / -1.00 / 5.00 7.00 3.30 10.00 (QUOTIENT) |
|---|---|---|---|---|---|---|
| 1 | +0 H / +0 C | 68-63-68-60 / 78-83-78-77 | 1 | 10 | 19 | 28 | 37 |
| 2 | +1 H / +1 C | 69-64-69-61 / 79-84-79-78 | 2 | 11 | 20 | 29 | 38 |
| 3 | -1 H / -1 C | 67-62-67-59 / 77-82-77-76 | 3 | 12 | 21 | 30 | 39 |
| 4 | +1 H / -1 C | 69-64-69-61 / 77-82-77-76 | 4 | 13 | 22 | 31 | 40 |
| 5 | -1 H / +1 C | 67-62-67-59 / 79-84-79-78 | 5 | 14 | 23 | 32 | 41 |
| 6 | +2 H / -0 C | 70-65-70-62 / 78-83-78-77 | 6 | 15 | 24 | 33 | 42 |
| 7 | -0 H / +2 C | 68-63-68-60 / 80-85-80-79 | 7 | 16 | 25 | 34 | 43 |
| 8 | +2 H / +2 C | 70-65-70-62 / 80-85-80-79 | 8 | 17 | 26 | 35 | 44 |
| 9 | -2 H / -2 C | 66-61-66-58 / 76-81-76-75 | 9 | 18 | 27 | 36 | 45 |

AUTO-PROGRAMMABLE ELECTRONIC THERMOSTAT

BACKGROUND

1. Field of the Invention

The invention relates to the field of electronic thermostats and more particularly to, an auto-programmable electronic thermostat.

2. Description of Related Art

There are several programmable thermostats now available in the market. To operate these thermostats, a user may select a plurality of times and assign a desired temperature to each time. This information i.e., an operating program, is stored in a memory, for example, a Ready Access Memory (RAM), of the thermostat. The thermostat then controls a heating or a cooling system, or both, according to the programmed times and temperatures, i.e., a program set, in a well known manner. As used herein, the term "program set" shall refer to a group of programs each including a starting time and corresponding temperature. For example, the times and temperatures associated with program numbers 1–4 in Table 1 constitute a program set. An example of one program set is shown in Table 1.

TABLE 1

| Prog. | Time | Temperature | Remarks |
|---|---|---|---|
| 1 | 6:00 A.M. | 68° F. | Wake up |
| 2 | 8:00 A.M. | 60° F. | No one at home |
| 3 | 3:30 P.M. | 69° F. | Children return home |
| 4 | 11:00 P.M. | 63° F. | Sleep |

As shown in Table 1, four times and temperatures are entered to define the program set. These entries are designated by program numbers (1–4). A time and a temperature is associated with each of these program numbers. The remarks are provided as an explanatory device for this example. In this example, at 6:00A.M., the temperature is set at 68° F. This corresponds to a time when the user would normally wake up. By 8:00A.M., the user leaves the house, and the temperature may be lowered. Thus, at 8:00A.M., the temperature setting is lowered to 60° F. At 3:30P.M. the user's children return to home, and it is desirable to raise the temperature to 69° F. Finally, at 11:00P.M., the user goes to sleep, and the temperature is again lowered, i.e., to 63° F. Table 1 represents a single example of a program set containing a plurality of times and temperatures which may be used to vary the temperature throughout the day based on the user's (or the user's family's) schedule, which the thermostat is to control. It is to be understood that other program set may be desirable for other users.

In many programmable thermostats, a default program set may be provided. The default program set may consist of a group of programs which are stored in a thermostat's long-term or permanent memory, i.e., a Read Only Memory (ROM), automatically loaded into the working memory i.e., the RAM, of the thermostat during power-up. In essence, this is part of an initialization of the thermostat. Depending on the type of information contained in the default program, the thermostat may control the heating and cooling system according to the default program parameters if the user does not program in his or her own parameters at the time of installation or after power-up. An example of a default program set may be similar to the program set shown in Table 1, in which a plurality of different times and corresponding temperatures are automatically loaded into the working memory at power up. In this case, when the unit is powered-up, the thermostat operates to control heating and cooling according to the values of Table 1. The user then may alter these settings by individually programming new times and temperatures as desired. "Program," "Hours," "Min," and "Temp" (or similar function keys) may be used in combination with arrow up/down keys to input a specific programming sequence to alter the programs while in a program mode which is well known in the art. Because the default program set includes several programs with different times and temperatures which are pre-programmed at the time of manufacture, thermostats using such programs may be referred to as "pre-programmed" thermostats. This type of "pre-programmed" thermostat is described in U.S. Pat. No. 4,308,991. However, various drawbacks exist with such thermostats.

A problem with the "pre-programmed" thermostats is that upon first application of power, the thermostat is set according to the default program parameters (i.e., different times and corresponding temperatures). If these values are not satisfactory the user must spend a sufficient amount of time learning how to program the thermostat in order to change the default values to desired values. This may be confusing for some and overly complicated for others, and always requires the user's time and patience. Moreover, because only one pre-programmed program set exists, all users are unlikely to be completely satisfied with the single program set of pre-programmed values. If the user is dissatisfied immediately after power-up, the user must either accept the pre-programmed values or learn how to program the thermostat. Similarly, if the user is satisfied with only two programs within the program set, the user must program the thermostat to remove the remaining two programs.

SUMMARY OF THE INVENTION

A need has arisen for a user friendly thermostat that operates as a manual thermostat at power-up enabling the user to manually select a desired temperature immediately without having to spend time and effort programming the thermostat. Further, a need for a thermostat that enables users to more easily customize or "program" their thermostats, as compared to existing "pre-programmed" thermostats. Therefore, it is an object of the present invention to overcome the afore-mentioned drawbacks of the related art. Specifically, it is one object of the present invention to simplify the user programming of programmable thermostats.

In an embodiment, the invention may be a method of programming a programmable thermostat having a default program set and one or more pre-programmed program sets, wherein each pre-programmed program set comprises a plurality of times and a plurality of temperatures. The method may include the steps of selecting one of the plurality of pre-programmed program sets; programming the programmable thermostat with the times and temperatures of the selected pre-programmed program set; and altering the times and temperatures of the selected pre-programmed program set to create a tailored program set.

According to another embodiment, the invention may be an auto-programmable thermostat is provided having a default program set, for example, as shown in Table 2.

TABLE 2

| Prog. | Time | Temperature (Heating/Cooling) |
|---|---|---|
| 1 | 0:00 | 68° F./78° F. |
| 2 | 0:00 | 68° F./78° F. |
| 3 | 0:00 | 68° F./78° F. |
| 4 | 0:00 | 68° F./78° F. |

In such an embodiment, the invention may be an auto-programmable thermostat including a first memory, e.g., a RAM, having a default program set, which may receive at least a selected one of a plurality of pre-programmed program sets, wherein each pre-programmed program set comprises a plurality of times and at least a plurality of temperatures. The thermostat further includes a plurality of alphanumeric identifiers, each identifier corresponding to one of the plurality of pre-programmed program sets; and selection means, such as keys, dials, or buttons, for selecting one of a plurality of the alphanumeric identifiers. Means responsive to the selection means, such as a processor, may be used to replace the default program set on the first memory with the selected pre-programmed program set; and the thermostat also may include means for altering the times and temperatures of the selected pre-programmed program set.

The default program set may include a plurality, e.g., four times and temperatures (depending on whether heating or cooling is selected) are the same for each of the program numbers. Because 0:00 is a non-time designation, the thermostat is automatically set at power-up to operate at 68° F. in the heating mode or 78° F. in the cooling mode until a user either programs different times and temperature information, for example as shown in Table 1, or manually changes the temperature. An advantage over the prior art of having zero times or "non-times" is that the user may operate the thermostat as a manual thermostat immediately after power-up or upon reset. That is, the user has the option to immediately utilize individual controls, e.g., function keys and up/down arrow buttons, for altering temperature settings to change the temperature to a desired value without ever having to enter into a "programming mode." Thus, users who consider learning how to program an electronic thermostat too complicated or time consuming may postpone the programming of their thermostat to a later date while retaining the immediate ability to change temperatures easily. When the user is ready to program the thermostat, the user may then change one or more of the programs in the default program set in a known manner to desired times and temperatures.

In still another embodiment, the invention may be an auto-programmable thermostat including a first memory having a default program set, which receives one of at least one pre-programmed program sets, wherein each pre-programmed program set comprises a plurality of times and at least one set of a corresponding number of temperatures. Selection means may be used for selecting one of the at least one pre-programmed program set, and means responsive to the selection means may be used for replacing the default program set with the times and temperatures of the selected program pre-programmed set on the first memory. Finally, the thermostat may have means for altering the times and temperatures of the selected pre-programmed program set.

Alternatively, an embodiment of the invention may be an auto-programmable thermostat including a first memory having a default program set which is programmable, and a second memory for storing a plurality of pre-programmed program sets, where each pre-programmed program set has a plurality of times and at least a corresponding number of temperatures. Selection means again may be included for selecting one of the stored pre-programmed program sets, and means responsive to the selection means may be used for loading the times and corresponding temperatures of the selected pre-programmed program set in the second memory. Finally, the thermostat may have means for altering the times and temperatures of the selected pre-programmed program set.

Thus, an auto-programmable thermostats may be provided with at least one pre-programmed program set, in addition to the default program set described above, which has plurality of times and a corresponding plurality of temperatures. The pre-programmed program set or sets are not automatically loaded into the thermostat at power-up and, therefore, are not automatically operable at initial power-up. Rather, a user merely selects a number corresponding to a program set which is "pre-programmed" instead of individually selecting and programming times and temperatures. For example, a thermostat according to this embodiment may have forty (40) or more pre-programmed program sets, depending upon the size of the long-term memory available and the degree of pre-programming flexibility desired. As mentioned above, preferably, the sets are numbered (e.g., 1,2,3, . . . ) or lettered (e.g., A,B,C, . . . ) or are designated with some combination thereof. For convenience, program sets are referred to as numbered sets.

According to one aspect of the present invention, to program the thermostat with a plurality of desired times and temperatures, the user simply selects the number corresponding to the desired program set, which may be loaded to the thermostat's working memory by simply pressing a push-button labeled "AUTO-PROG," and the thermostat is automatically programmed with the plurality of times and temperatures which correspond to the selected program set. These programs then may be altered in a known manner to exact times and temperatures as desired by the user.

To implement one embodiment of the present invention, there may be a long-term memory such as a non-volatile ROM, for storing a plurality of program sets including the default program set. In order to access a desired program set, a matrix having a plurality of rows and columns is provided. Preferably, each column has a plurality of times associated therewith, and each row has a set or sets of a plurality of temperatures associated therewith. In operation, the user identifies the program set defined by the intersection of a desired column and row according to the times and temperatures identifying, e.g., heading, particular columns and rows. The user then selects the number (or other alphanumeric designator), which describes the intersection of the desired column and row. By selecting this number, the desired program set (times and temperatures) associated with the selected column and row is automatically programmed into a working memory, such as a battery-backed RAM in the thermostat.

In yet another embodiment, the invention may be an auto-programmable thermostat including a first memory which is programmable and has a default program set, but also including a second memory for storing at least one standard program set, wherein the standard program set comprises a plurality of times and at least a corresponding number of temperatures. Selection means are available for selecting a program set for loading in the first memory, wherein at least one of the times and temperatures of the selected program set has a predetermined relationship with the time and temperatures of the standard pre-programmed program set, so that the selected program set is derived from the standard pre-programmed program. Further, the thermostat includes means responsive to the selection means for replacing the default program set in the first memory with the times and temperatures of the selected program set; and means for altering the times and temperatures of the selected program set.

In that embodiment, one or more standard program set may be stored and a plurality of other program sets may be generated therefrom based on one or more constants or formulas. In this embodiment, each program set may have times and temperatures which vary by a constant or calculated factor with respect to the times or temperatures, or both, of the stored program set(s). In this manner, a "virtual matrix" may be generated using one or more stored program sets and one or more constants or formulas. The term "virtual matrix" is used to denote that, even though all of the program sets are not actually stored in the thermostat's long-term memory, e.g., the ROM, the operation appears to the user to be the same as if the actual program sets were permanently stored.

Other objects, features, and advantages are readily apparent to those skilled in the art from the drawings, descriptions, and claims which follow.

BRIEF DESCRIPTION OF THE DRAWINGS

For a more complete understanding of the present invention and the objects, features, and advantages thereof, reference is made to the following description taken in conjunction with accompanying drawings, in which.

DESCRIPTION OF PREFERRED EMBODIMENTS

Figure 1:
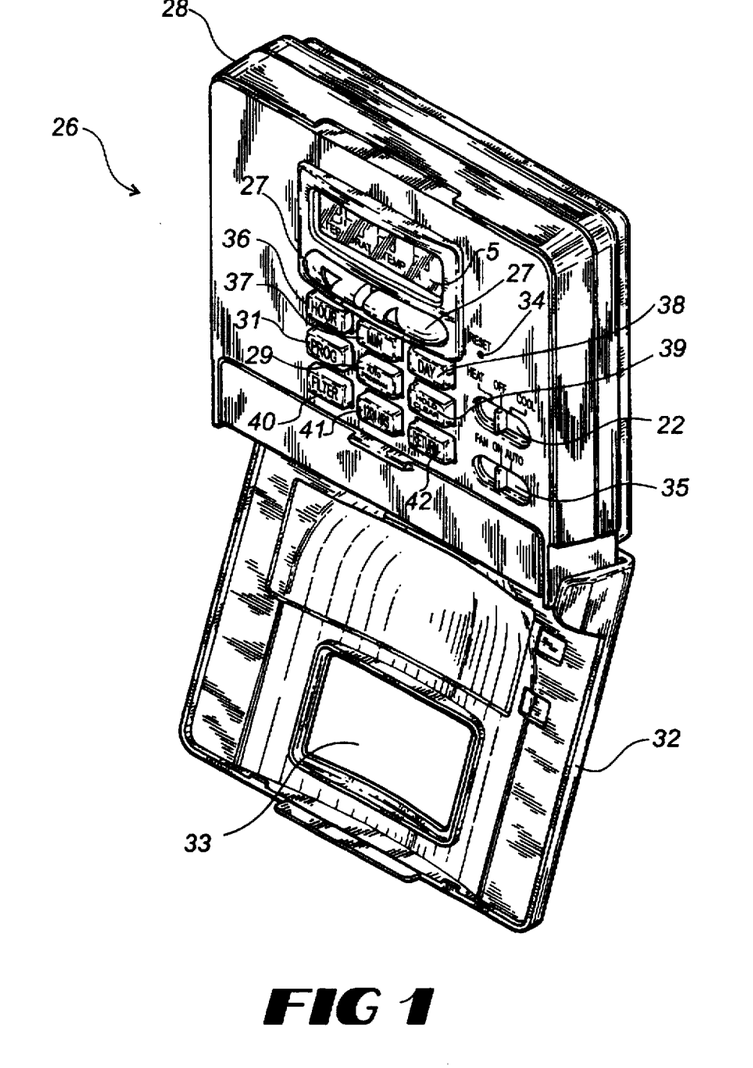
FIG. 1 depicts a perspective view of the exterior of an auto-programmable thermostat embodying the features of the invention.

Referring now in more detail to the drawings, FIG. 1 shows a representative auto-programmable electronic thermostat 26 embodying the features of the invention. Thermostat 26 includes a generally rectangular housing 28 that is easily mounted to a wall surface (not shown). Housing 28 includes a LCD display 5 which shows the current values of time, day, temperature, program number, hold, heat or cool usage, low battery indicator, and filter indicators. Individual push-button arrow up/down keys 27 are positioned directly beneath the LCD display 5 for manually adjusting the temperature of the thermostat 26 or programming the thermostat 26 as discussed below in greater detail. A reset button 34 is provided for resetting the processor back to 12:00A.M. and clearing all program sets from a working memory except for a default program set, discussed further below. A manual device selecting switch 22 enables a user to select between the heating and cooling systems or an off position and a manual switch 35 allows the user to choose between automatic or continuous fan operation. A plurality of soft touch programming buttons are provided directly below the arrow up/down keys 27 for programming the thermostat 26. The programming buttons may include an hour button 36 for entering the hour of day, a minute button 37 for entering the minute of day, a day button 38 for entering the day of the week, a PROG button 31 for revising and changing the weekday or weekend programs, an AUTO PROG button 29 for automatically programming the thermostat 26, a hold/clear button 39 which provides permanent temperature setting by overriding stored programs or converts to manual operation of the thermostat 26, a filter button 40 for indicating the usage of the filter in hours and minutes, a 12/24 HRS button 41 for changing the clock into 12 or 24 hour mode, and a return button 42 for returning the LCD display 5 to current time and temperature. A door 32 is pivotally mounted to housing 28 and is selectively movable between an open position, shown in FIG. 1, and a closed position (not shown). Door 32 includes an opening 33 for allowing direct access to display 5 and arrow up/down keys 27 when in the closed position.

Figure 2:
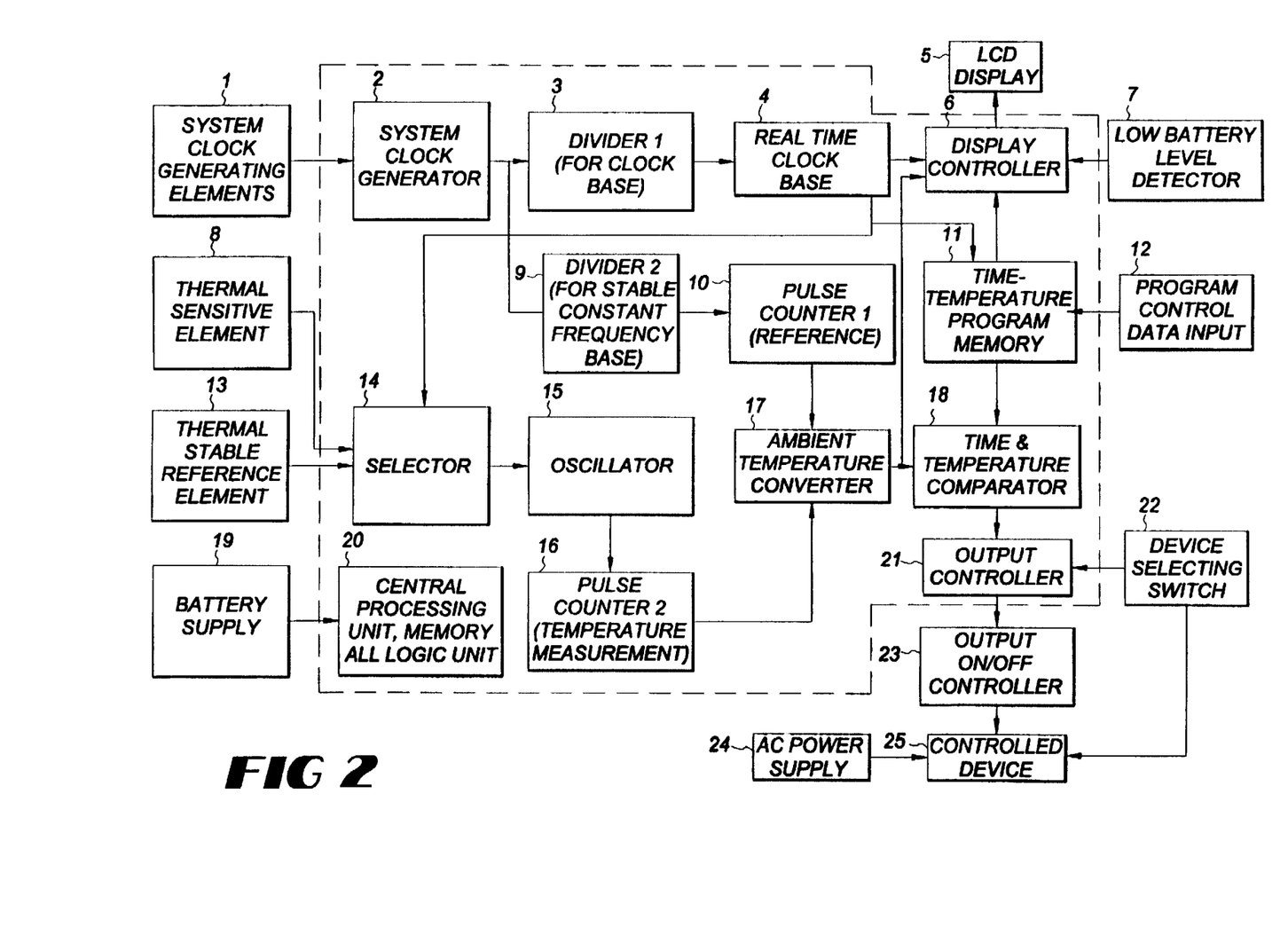
FIG. 2 is a block diagram illustrating a central circuit which may be used with the present invention.

Referring to FIG. 2, at the time of manufacture, a default program set, preferably as shown in Table 2, is stored in a long-term memory 20. The four times and temperatures (depending on whether heating or cooling is chosen) are the same for each of the program numbers. Upon first application of power to thermostat 26, the default program set is loaded and stored in working memory 11 as part of an initialization of the thermostat 26. Because there is no time designation (i.e., time=0:00 for each program number), the thermostat 26 will automatically be set at initial power-up or upon reset to operate at 68° F. in heating mode or 78° F. in cooling mode until the user either programs different times and temperature information, such as shown in Table 3 below, or manually changes the temperature. Having zero times or "non-times" for each program in the default program set enables the user to operate the thermostat 26 as a manually set thermostat immediately after power-up or upon reset. Thus, the user has the option to immediately utilize the arrow up/down keys 27 to change the temperature to a desired value without having to enter into a "programming mode." Therefore, users who consider learning how to program an electronic thermostat too complicated or time consuming may defer programming their thermostat to a later date while maintaining the immediate ability to change temperatures easily. When the user is ready to program the thermostat with different time and temperature information, the user then may change one or more of the programs in the default program set in a known manner.

Figure 3:
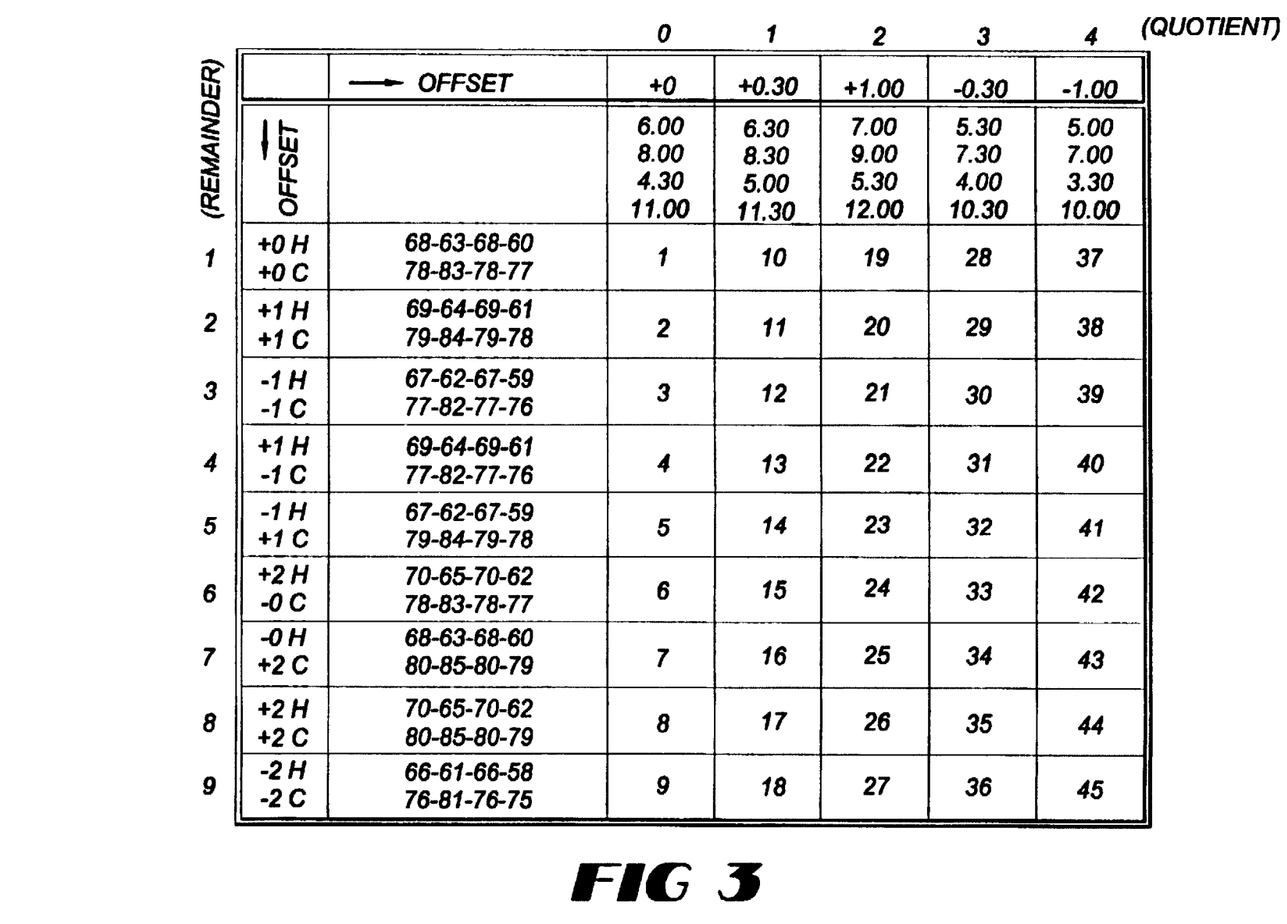
FIG. 3 is a table displaying a plurality of pre-programmed program sets which may be used in accordance with a preferred embodiment of the invention.

FIG. 3 depicts a program table, which illustrates certain aspects of the present invention. The invention, however, is not limited to the program table of FIG. 3. FIG. 3 essentially shows a five (5) column by nine (9) row matrix with the points of intersection labeled with the numbers 1–45. However, designations may be used. The heading for each of the columns includes a plurality of times. For example, the headings for column 1 are 6:00A.M., 8:00A.M., 4:30P.M., and 11:00P.M. The headings for column 2 are 6:30A.M., 8:30A.M., 5:00P.M., and 11:30P.M. In a preferred embodiment, there may be a fixed relationship between the times or temperatures, or both, of a standard program (e.g., the times and temperatures of column 1 and row 1) and the respective times and temperatures in some or all of the other columns and rows. This fixed relationship is shown by the offsets associated with the respective rows and columns. For example, each of the times of column 2 is 30 minutes later than the corresponding time of column 1. Therefore, the offset is +0.30 (30 minutes). In other embodiments, different offsets may be employed. As noted in FIG. 3, two sets of four temperatures are shown for each heading for each row. For example, in row 1, the first set of temperatures are 68°, 63°, 68°, and 60° (°F.), which correspond to heating mode settings and, the second set of temperatures for row 1 are 78°, 83°, 78°, and 77° (°F.), which correspond to cooling mode settings. Similarly, two sets of a plurality of temperatures are provided for each of the other rows in the matrix of FIG. 3.

In operation, if a user desires to select the times of column 1 (6:00A.M., 8:00A.M., 4:30 P.M., and 11:00P.M.) and to have the temperatures at those times correspond to the temperatures shown in the row headings of row 8 of FIG. 3 (70°, 65°, 70°, 62° F. for the heating mode; 80°, 85°, 80°, 79° F. for the cooling mode) the user may simply enter the programming mode (in a known manner) and select program set 8. For example, this may be accomplished simply by pressing the "AUTO PROG" key 29 eight times. Selection of program set number 8 causes the times of column 1 and the respective temperatures of row 8 to be stored in working memory 11 to thereby program the thermostat. Therefore, for this example, working memory 11 will be programmed as shown in Table 3.

TABLE 3

| Prog. | Time | Temperature (Heating/Cooling) |
| --- | --- | --- |
| 1 | 6:00 A.M. | 70° F./80° F. |
| 2 | 8:00 A.M. | 65° F./85° F. |
| 3 | 4:30 P.M. | 70° F./80° F. |
| 4 | 11:00 P.M. | 62° F./79° F. |

Therefore, in order to program four times and corresponding heating and cooling temperatures for each time, a user simply selects a single program set number by pressing the "AUTO PROG" key 29 a number of times corresponding to the program set number and this information is stored in memory 11. This avoids the time and difficulty which is required for a user to individually select a plurality of times and individually select a corresponding number of temperatures to be associated therewith. However, the user then may change one or more programs by a known method to desired times or temperatures if all of the parameters of the selected program set are not desired by the user.

Figure 4:
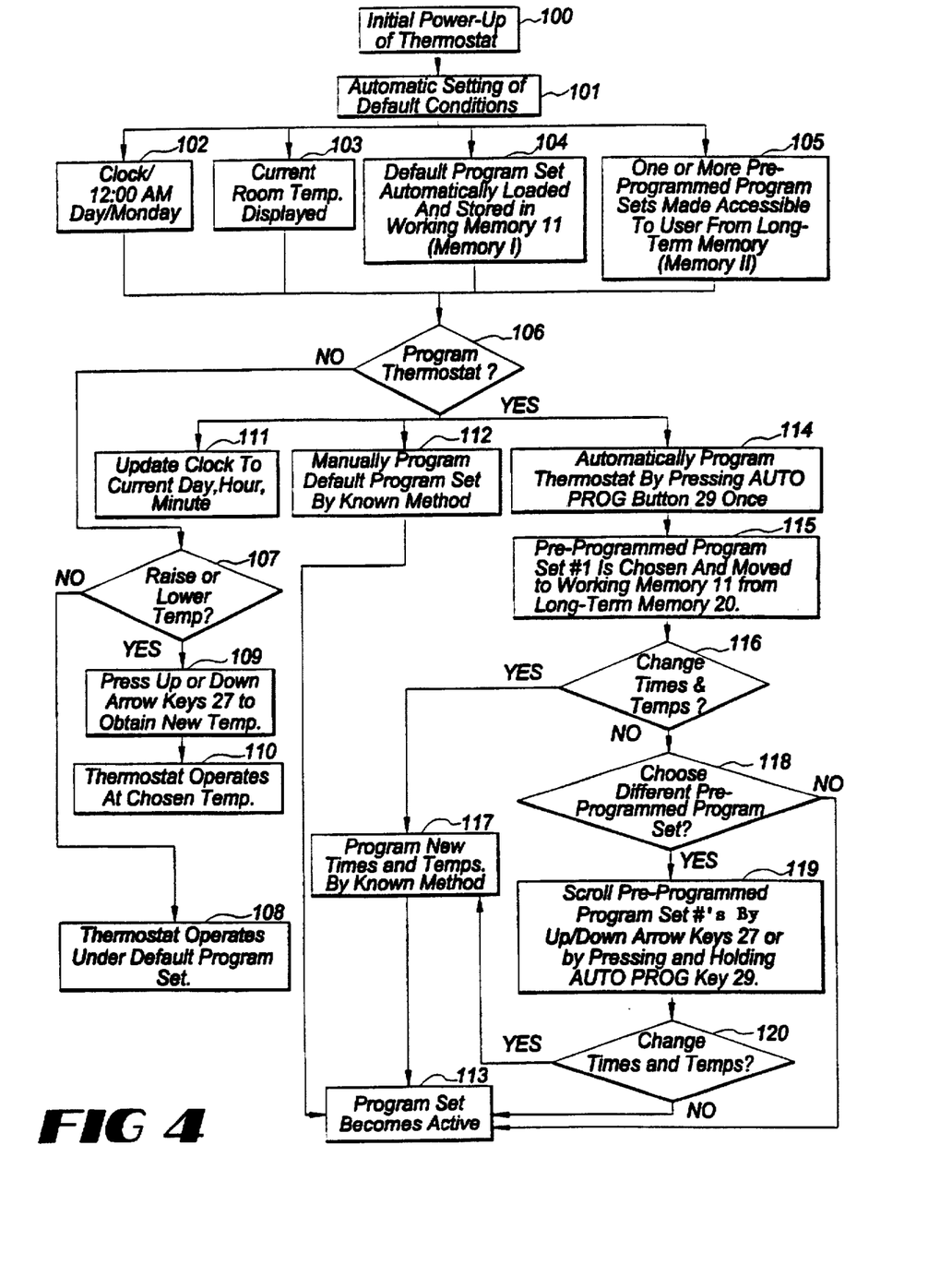
FIG. 4 is a flow chart depicting the operation of a thermostat employing a table such as that shown in FIG. 3.

Referring to FIG. 4, at initial power-up of thermostat 26 (step 100), the thermostat is automatically set in a default condition (step 101). The day and time is automatically set to Monday, 12:00 AM. (step 102), the current room temperature is displayed on display 5 (step 103), the default program set is automatically loaded and stored in working memory 11 (step 104), and one or more pre-programmed program sets are made available to the user at user's option (step 105). Once the default conditions are set, the user has the option to program the thermostat 26 (step 106). If the user chooses not to program the thermostat 26, the user still retains the ability to manually raise or lower the temperature in the default program set (step 107). If the user chooses not to raise or lower the temperature, the thermostat 26 may be operated according to the default program set (step 108), or at a default temperature. If the user wishes to immediately raise or lower the temperature, the user may do so by pressing and holding the up or down arrow keys 27 until the desired temperature is obtained (step 109). The thermostat 26 may then be operated at the chosen temperature (step 110).

If the user decides to program the thermostat 26, the user may first program the current time and day of the week (step 111), for example, by pressing the hour button 36 once which causes the temperature digits to disappear from display 5 leaving 12:00A.M. displayed. By further pressing and holding hour button 36, the hour displayed is changed in a known manner until the current hour appears on display 5. Likewise, pressing and holding the minute button 37 changes the minutes in a known manner until the current minutes appear on display 5. The day button 38 may also be sequentially pressed until the current day appears on display 5. Pressing the return button 41 or waiting 10 seconds causes the programmed time, day and current temperature to be displayed.

The user may also manually program the thermostat 26 by altering the default program set values, if desired, using a known method (step 112). For example, PROG button 31 may be pressed once to enter into the programming mode which will display the starting time and temperature of the first program within the default program set. Sequentially pressing the PROG button 31 will scroll through the subsequent programs in the default program set thus enabling the user to program only selected programs within the default program set leaving non-selected programs as is with their default values. Once entered into a program that is to be changed, the user may engage the hour 36 and minute 37 buttons as described above to change the starting time of that particular program. The temperature may also be changed by utilizing the up/down arrow keys 27 as described above. Once the user is satisfied with the new program set, the user may press the return key 42 or wait 10 seconds for the new program set to become active (step 113).

The user may also automatically program the thermostat 26 by pressing the AUTO PROG button 29 once (step 114). This moves program set #1 from the long term memory 20 to the working memory 11 (step 115). If desired, the starting times and temperatures associated with one or more of the programs within pre-programmed program set #1 may be changed to a desired value(s) (step 116). If the user wishes to change the value(s), the user may do so according to the procedure described above (step 117). If the user decides not to program the pre-programmed program set #1, the user has the option to choose from one or more different pre-programmed program sets in addition to program set #1 (step 118). This may be accomplished, for example, by scrolling through the pre-programmed program sets using the up/down arrow keys 27 or by pressing and holding the AUTO PROG button 29 (step 118). The starting times and temperatures associated with the new pre-programmed program set obtained may be changed according to the method described above (steps 117 and 119). Once the user is satisfied with the program set, the user may press the return key 42 or wait 10 seconds for the program set to become active (step 113).

In another embodiment, instead of permanently storing a matrix (i.e., all of the program sets) in long-term memory 20, which may occupy a large amount of memory space, one or more standard programs may be pre-programmed (i.e., stored in long-term memory 20) and used to generate several other program sets. Preferably, each program set has times and temperatures which may vary by a constant factor (or by some other predetermined mathematic relationship) with respect to the times or temperatures, or both, of the standard program set. For example, the thermostat may store just one program set, for example, program set 1, with temperatures $T_1$, $T_2$, $T_3$, and $T_4$ and corresponding times $t_1$, $t_2$, $t_3$, and $t_4$. Program set 2 may be derived from the stored parameters of program set 1 by adding a constant factor to the times or temperatures, or both, of the standard Temperature program set 1. For example, each of the times of program set 2 may be 30 minutes later than the corresponding times of program set 1. In this case, based on the times of program set 1 given above, program set 2 may have times of $t_1+30$. Similarly, the temperatures also may be altered by a constant amount, for example +2° F. from the temperatures of program set 1. Therefore, the temperatures of program set 2 man be $T_1+2°$. In this manner, a virtual matrix may be created using one stored program set and one or more formulas or constants. In this way, it may not be necessary to store the times and temperatures of program set 2 because they may be derived from the single set of times and temperatures stored in connection with standard program set 1.

Of course, a variety of other constants or formulas may be used to enable various program sets to be derived from the one or more standard program sets. In addition, it may be desired to separately program heating parameters and cooling parameters. In that case, there may be two matrices stored in long-term memory 20, one for a heating mode and one for a cooling mode. These two program sets may be created and loaded in the manner described above. Alternatively, one or the other of the sets of temperatures associated with a particular row may be separately accessed in a heating mode or a cooling mode. In operation, depending on whether the user selects the heating mode or the cooling mode (e.g., by means of a switch 30 on thermostat 26), either the heating parameters (times and temperatures) or cooling parameters are used by the thermostat to control either a heating or cooling system. Alternatively, the thermostat may be designed to automatically change from cooling mode to heating mode or heating mode to cooling mode, depending upon the set time and temperatures. Thus, in this embodiment, there is no need for the user to select the heating or cooling mode.

As stated above, the program set is preferably selected by a "AUTO PROG" key 29 or other suitable means, which generally enables the user to select the number of the desired program set. In this way, there is no need to separately use time or temperature keys to program a plurality of times and temperatures. All that is required is a single selection from a plurality of "pre-programmed" program sets. This greatly simplifies the user programming of a plurality of times and temperatures in a programmable thermostat. Again, however, the user has the option to utilize time or temperature keys, if desired, to program a plurality of times and temperatures. For example, after selecting the closest desired program set using the "AUTO PROG" key 29, the user may then press the "PROG" button 31 and utilize the time and temperature keys 27 to choose desired times and temperatures for a particular program within the desired program set. The user may change one or more programs within the desired program set using this known programming technique.

A variety of different mechanisms are available to enable the user to view the particular set times and temperatures associated with each program set number. For example, a display 31 may be associated with the thermostat or separate charts may be provided in a manual or in a table on the door of the thermostat, or both. Preferably, the user does not have access to alter the standard program sets.

Figure 5:
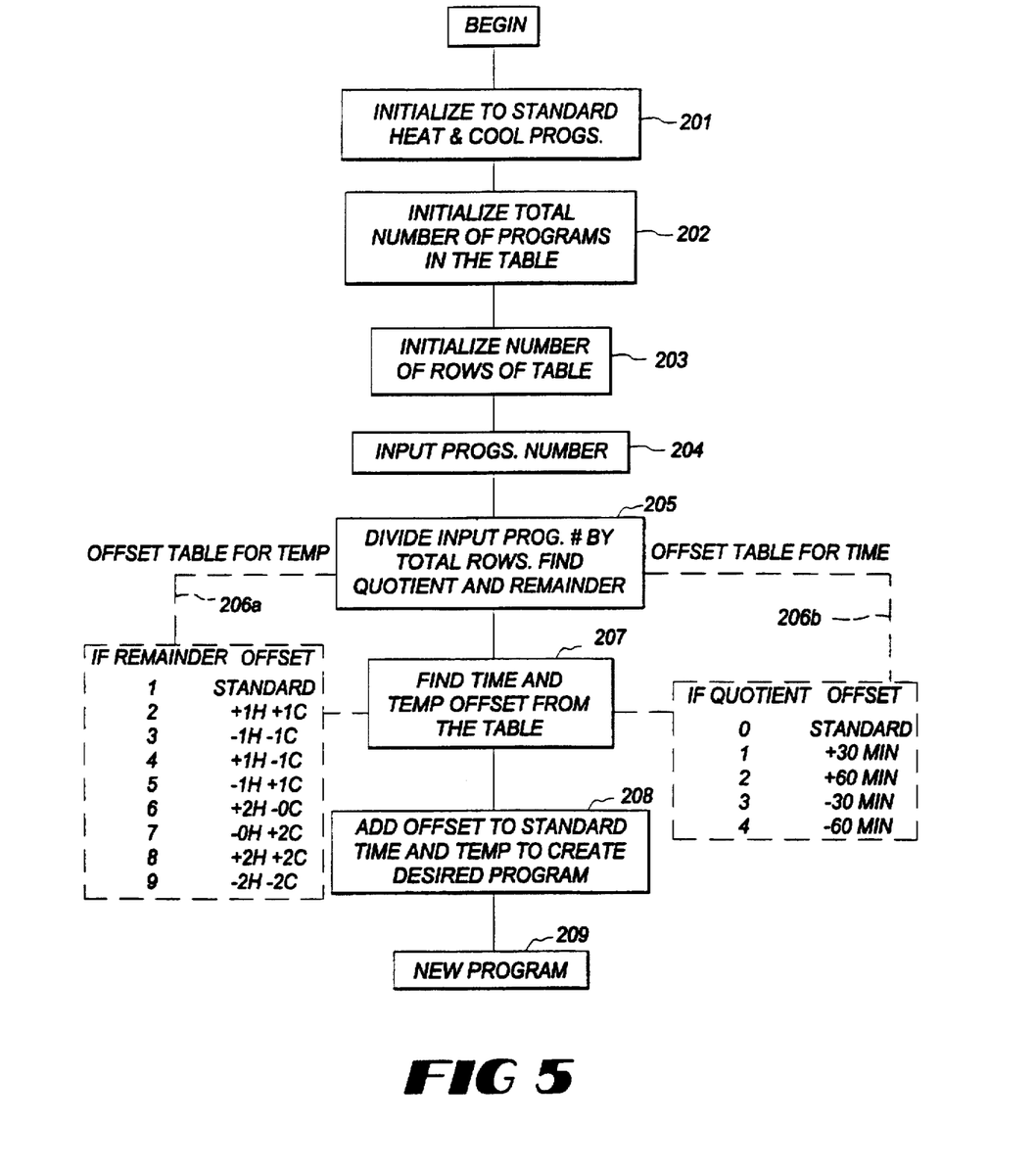
FIG. 5 is a flow chart depicting the operation of a thermostat employing at least one standard program set.

FIG. 5 shows a flow chart of operation and a procedure which may be used to program the thermostat according to one embodiment of the invention. Once power is initially applied to thermostat 26 (step 200), a default program set or a standard initialization program set is initialized (step 201) which involves automatically loading their respective heating or cooling programs into working memory 11 from long-term memory 20. For example, the default program set, as shown in Table 2, may be loaded into working memory 11 at power-up. Because there is no time distinction made in any of the programs (i.e., time=0.00) and all of the temperatures are the same, thermostat 26 controls the heating and cooling system according to 68° F. and 78° F. depending on whether heating or cooling is chosen, respectively. Alternatively, program set 1 from FIG. 3 may be loaded. The times 6:00A.M., 8:00A.M., 4:30P.M. and 11:00 P.M. are loaded as the program times and the heating and cooling temperatures associated with these times will be 68°/78° F., 63°/83° F., 68°/78° F., and 60°/77° F., respectively.

The total number of programs in the table then are initialized (step 202). In the example shown in FIG. 3, there are a total of forty-five (45) programs. Next, the number of rows of the table is initialized (step 203). In this case, there are nine rows (and five columns). The controller then waits for the user to input a program number (step 204). For example, if the number 22 is entered, the input program number (22) is divided by the total number of rows to find a quotient and remainder (step 205). In this case, 22/9 equals a quotient of 2 and a remainder of 4.

Figure 6:
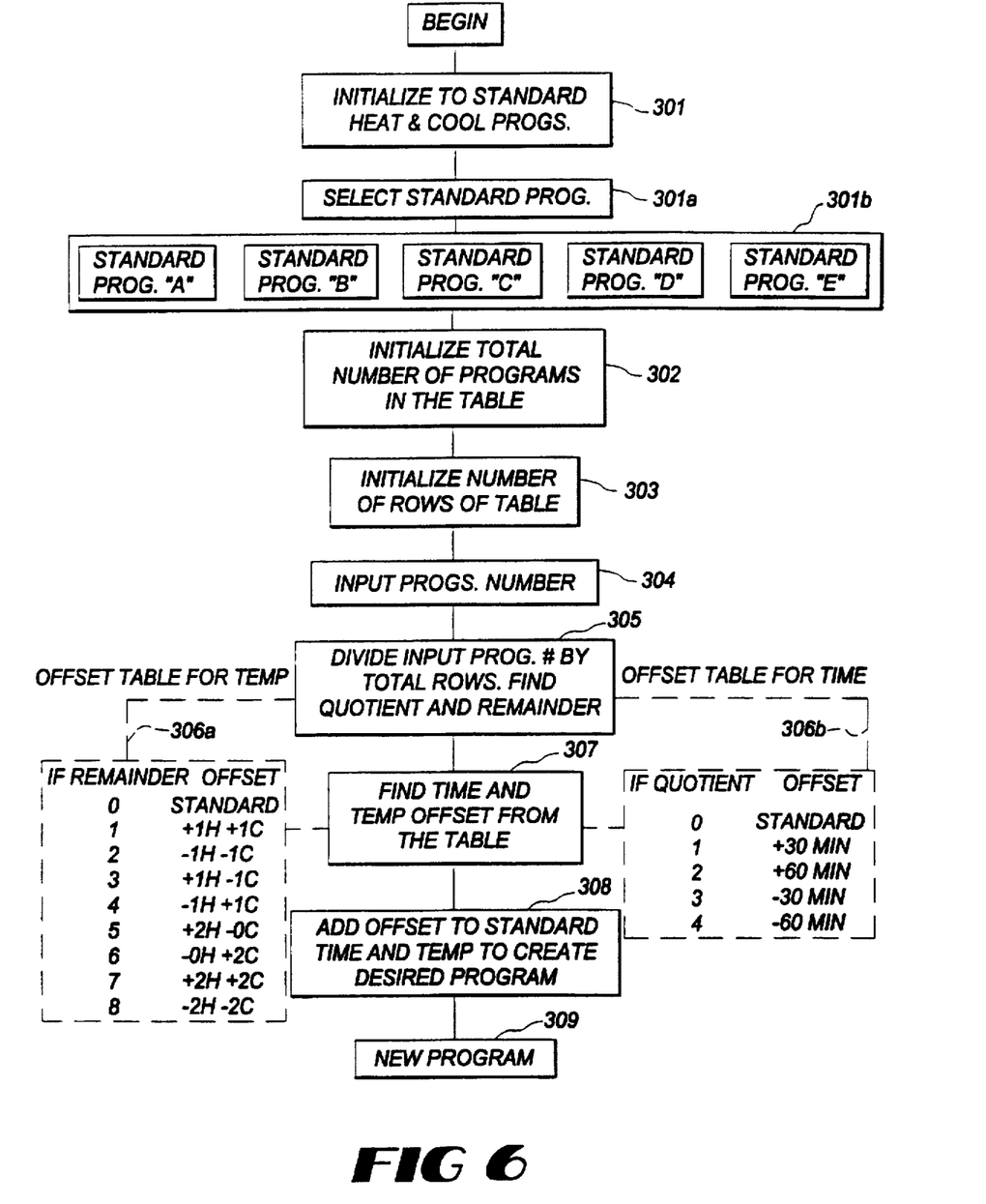
FIG. 6 is a flow chart depicting the operation of a thermostat employing a plurality of standard program sets.

In one embodiment, this information may be used to indicate a selection of the second column 110 and the fourth row, or vice versa. If a complete table is stored (such as shown in FIG. 3), the corresponding times and temperatures of the selected program can be retrieved from permanent long-term memory 20 and stored in working memory 11. In still another embodiment, this information is provided to an offset table for temperature (step 206a) and an offset table for time (step 206b). The time and temperature offsets from the offset tables (step 207) are used to establish a desired offset for the times and temperatures of the standard program. In the example shown, the offset corresponding to a quotient of 2 is +60 min. The remainder is used to establish the offset for the temperature. In the example shown, a remainder of 4 corresponds to an offset of +1° F. for heating (H) and −1° F. for cooling (C). In step 208, the offsets are added to the standard time and temperature to create the desired program. In the example shown, the selected times are 6:00A.M.+1:00=7:00A.M.; 8:00A.M.+1:00=9:00A.M.; 4:30P.M.+1:00=5:30P.M.; and 11:00P.M.+1:00=12:00P.M. The heating temperatures are 68°/63°/68°/60° F.+1° F.=69°/64°/69°/61° F. The cooling temperatures are 78°/83°/78°/77° F.−1° F.=77°/82°/77°/76° F. These values then are stored in working memory 11 as the programmed times and temperatures. As shown in FIG. 6, various standard programs may be provided. The operation of the embodiment shown in FIG. 6 is similar to that of FIG. 5. A significant difference between these embodiments is that during initialization, the user may select from a plurality of standard programs (e.g., A, B, C, D, or E).

Figure 7:
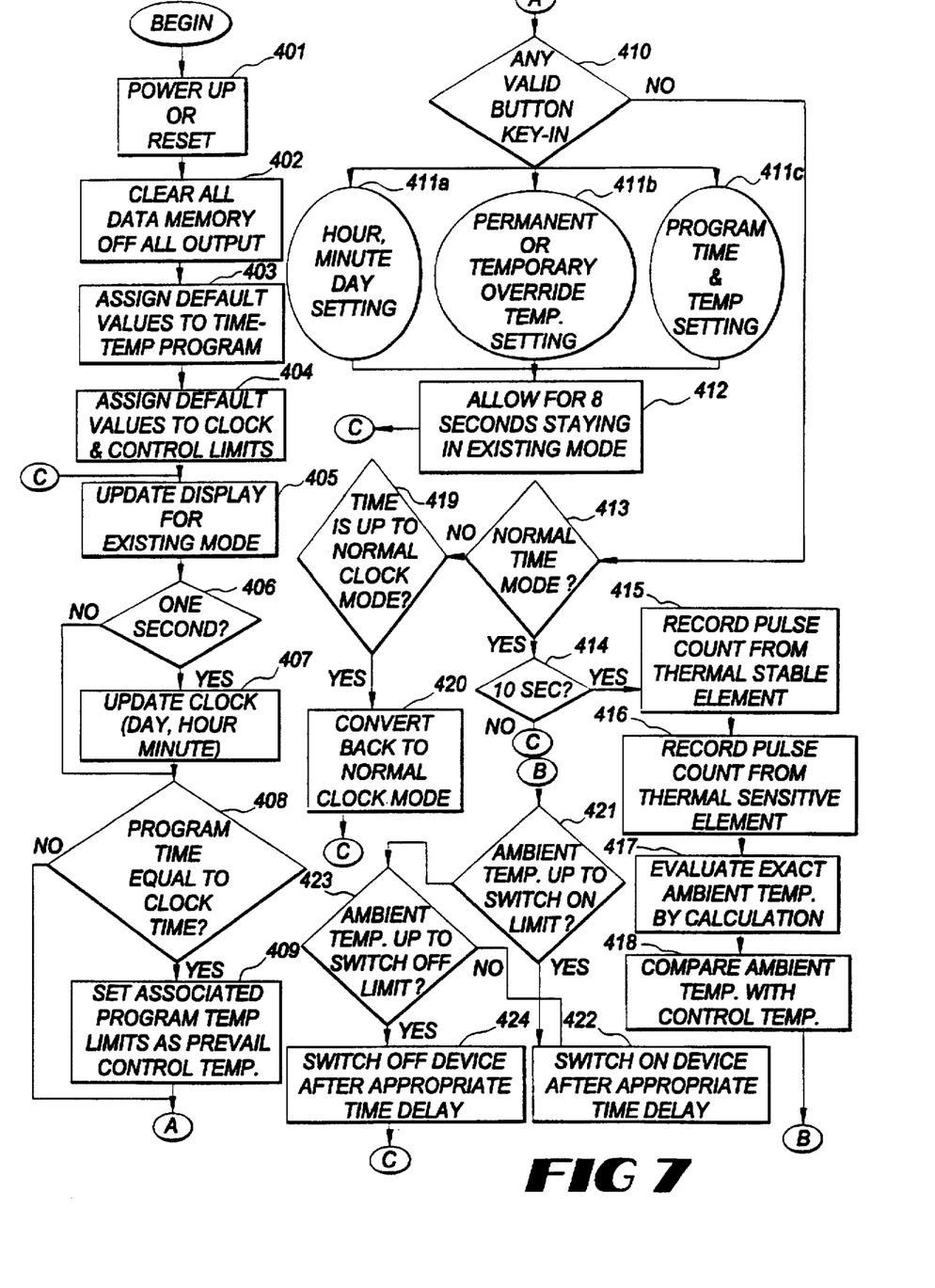
FIG. 7 is a flow chart depicting a method of programming a programmable thermostat in accordance with the invention.

A more detailed flow chart of the operation of a thermostat according to this invention is shown in FIG. 7. As shown in FIG. 7, after power up or reset (step 401), all data in working memory 11 is cleared (step 402). Default values then are assigned to the time-temperature program (step 403). For example, the default program set of Table 2 may be used to provide the default values. Subsequently, default values are assigned to the clock and control limits (step 404). For example, the default time may be zero or 12:00A.M. Monday, and maximum and minimum limits may be assigned. The display then is updated for the existing mode whether it is time, temperature, programming, or another mode (step 405). The existing mode is a mode in which the display shows a current situation (normal time mode), and the control exerted by the thermostat is as per the existing control conditions of the program or manual override, or another control conditions existing just after the user employs the keys to insert a new temperature, program number, set time, manual override, or other such operation.

If one second has passed (step 406), the clock is updated as necessary (step 407). If in step 406, one second has not passed, a determination is made as to whether the program time equals the clock time (step 408). If the program time equals the clock time, the control passes to step 409, and the program temperature is replaced by new program temperature of a next program. If not, control passes to step 410. If step 410, it is determined that any valid key has been pressed, control passes to steps 411a, 411b, and 411c. If not, control passes to step 413. Any time the user activates any of the available keys on the thermostat for a particular reason (in this thermostat there are three main reasons to press keys) steps 411A, 411B, or 411C, the thermostat allows the user to perform the operation such that instead of displaying the current time and temperature (which may otherwise be displayed continuously) on the display, the display is responsive to the key strokes and displays the operational sequence depending on the key strokes. In other words, when the user is activating keys, the display is controlled by the keystrokes, and activate the current time and temperature are not displayed.

If control is in steps 411A, B or C, and the user does not activate any of the keys for a period of about eight (8) seconds, the thermostats program logic assumes that the user has completed the operation in steps 411A, B, or C and the program automatically exits step 410. Nevertheless, before continuing to step 413, the current time and room temperature is updated because some time period elapsed during step 411A, B, or C to perform an operation. As a result, no updating of the time and temperature occurred on the display. To update to the existing (or a new situation or situations after the key operations, the control passes to flow chart section "C" to return the display and control to the control of current program. From step 411 A–C, control passes to step 412 and then returns to "C," i.e., step 405. In step 412, a time lapse of about eight seconds is provided between any two key strokes to enter data or to perform another operation. In step 413, it is determined whether the control is in a normal time mode. If yes, it is determined whether ten seconds has passed (step 413). If the results of the determination of step 413 is negative, control passes to step 419.

The ten (10) seconds (or other desired time) defines a no-activity period of some functions of the computer, such as measuring and displaying room temperature. This period reduces battery usage by not making the computer work hard continuously. During this ten (10) second period, the display is in a normal time mode. But if during this ten second period the user interrupts, for example by activating any of the keys, to perform certain functions, the control jumps to section "C" without waiting for those ten (10) seconds to be completed, so that the user does not have to wait up to ten seconds to obtain a response to the selected operation. In step 419, it is determined whether it is time to return to normal clock or time mode. If so, the control causes the conversion back to the normal clock mode (step 420). If not, control returns to section "C" at step 405. In step 414, if ten seconds have passed without activity, a temperature measurement is made, and a pulse count from a thermal stable element is recorded (step 415).

Temperature measurement consumes a significant amount of the thermostat's battery power. Therefore, instead of updating temperature every second (as is done with time), temperature is measured and updated at certain time intervals, e.g., ten (10) seconds, to save battery power. A pulse count from a thermal sensitive element is recorded (step 416), and the ambient temperature is calculated (step 417). The calculated ambient temperature then is compared with the control temperature programmed for the particular time (step 418), and control passes to step 421. In step 421 it is determined whether the ambient temperature has reached the switch-on limit. If so, the appropriate heating or cooling device is switched-on after a predetermined time delay (step 422). This time delay may preferably be three to six (6) minutes and is provided for the safety of the compressor. The time delay is also measured as the period of time from when the system last went off. If the system is switched on immediately within three to six (6) minutes, after the last switch off event, the system may be damaged. To prevent compressor damage, a built-in timer is provided to prevent the restarting unless the three to six (6) minute delay has passed from the last shut-off time of the compressor. For heating systems, this time delay is not required. If the result of the determination of step 421 is negative, it is determined whether the ambient temperature has reached the switch off limit (step 423). If so, the appropriate heating or cooling device is switched-off after a predetermined time delay (step 424). If the results of the determination of step 423 is negative, or after the device is switched-on or switched-off (step 422, 424), control returns to step 405.

The thermostat may comprise a single chip microcontroller, for example an OKI MSM64164. Other microcontrollers specially designed for temperature measurement applications may also be used. The micro-controller preferably has built in oscillation circuitry and counters for measuring the frequency generated by an externally attached thermal sensitive element. Preferably, it has a long-term memory 20, which is a 2048 word ROM for permanent storage of software and program sets, and a working memory 11 which is a 128×4 bits RAM for time and temperature data storage. An input panel is provided for a user to key in all the program information. A set of output device select switches are also provided for the user to select one or more output devices being controlled. Output driving circuitry which switches on or off the relevant device under control is also provided.

The system clock oscillator (preferably 32,768 Hz.) generates the main timing signal for the micro-controller. This timing signal is repeatedly divided by divider 3 (FIG. 2) to generate a one second timing signal for the software counter.

A preferred embodiment of the control apparatus is shown in FIG. 2. With reference to FIG. 2, a thermal stable element 13, which may comprise a fixed resistor (which serves as a reference) is selected by a selector 14 and connected to an oscillator 15. Thermal stable element 13 causes oscillator 15 to produce a constant oscillation frequency. The number of pulses generated by the oscillator 15 within a fixed period is counted by a pulse counter 16 and recorded. A thermal sensitive element 8, which may comprise a thermistor, then is selected and connected to oscillator 15. This causes the oscillation frequency generated by the oscillator to vary as a function of the temperature sensed by the thermal sensitive element. The number of pulses received by pulse counter 16 within the same period is also recorded. Pulse counter 10 fixes the exact period of time for pulse counter 16. The number of pulses generated by thermal stable element 13 and thermal sensitive element 8 are compared, and the exact ambient temperature is calculated from the result of the comparison by an ambient temperature converter 17. Preferably, the thermostat composes a set of built-in programs. By using the table of the program listing as described above, the user may enter the preferred program set via input panel 12.

Each second the micro-controller attempts to compare the program time with the real time clock and determine whether there is a program time match. Once matched, the two program temperature limits (one for heating control and the other for cooling control) are used as control reference points until the next program time match occurs. The time and temperature converter 18 compares the ambient temperature with these two control reference points. Once the ON/OFF criteria is reached, an ON/OFF switching signal is sent out to output controller 21 for switching device 25 ON or OFF. The controlled device may be selected by a user by a device selecting switch 22. Switch 22 may switch, for example, between cooling or heating devices, or both.

Additionally, it is preferable to enable the user to manually override the current set temperature temporarily by inserting a manual override temperature which is effective until the next time change of the selected program set. Alternatively, overrides for an extended period of time (e.g., when the user goes on vacation) may be provided. In this case, the user may return to the set program when desired. Separate matrices also may exist for weekdays and weekends (or holidays) to enable different programs to be operable for weekdays and weekends (or holidays) or other desired periods of times.

Another feature is that the thermostat may have the capability to monitor the total usage of the system by logging the run time of the system and storing this information in a memory. The usage may be selectively recalled by the user.

The foregoing are the preferred embodiments of the invention. All times, temperatures, constants and formulas shown above are by way of example only. The number of times, temperatures, stored programs and standard programs are also for purposes of example. Various modifications will be readily apparent to one of ordinal skill in the art. For example, the standard programs can include various combinations of temperatures keeping the times constant. Alternatively, the temperatures can be constant and various combinations of times can be used for different standard programs. Although a detailed description of the present invention has been provided above, it is to be understood that the scope of the invention is not to be limited thereby, but is to be determined by the claims that follow.

What is claimed is:

1. A method of programming a programmable thermostat having a default program set and one or more pre-programmed program sets stored in a long-term memory and loadable into a working memory, the default program set being loaded into the working memory upon power-up of the programmable thermostat, wherein each pre-programmed program set comprises a plurality of times and a plurality of temperatures, the method comprising the steps of:

selecting one of said one or more pre-programmed program sets stored in long-term memory;

programming the programmable thermostat with the times and temperatures of the selected pre-programmed program set by loading the selected pre-programmed program set into the working memory; and altering the times and temperatures of the selected pre-programmed program set within the working memory to create a tailored program set within the working memory which may remain within the working memory until further alteration by a user of the programmable thermostat.

2. The method of claim 1, further comprising the step of deriving the selected program set from one of a plurality of standard program sets.

3. The method of claim 1 further comprising the steps of:

initializing the thermostat by applying power to the thermostat that is in a non-powered state;

loading the default program set from the long-term memory into the working memory automatically upon initializing the thermostat; and altering the default program set within working memory to create a tailored program set within the working memory.

4. The method of claim 3 wherein said default program set includes not more than one time and not more than one temperature of each of a heating and cooling operation.

5. The method of claim 4 wherein the altering of the default program set includes the step of loading the pre-programmed program set from the long-term memory to replace the default program set in the working memory.

6. The method of claim 4 wherein said not more than one time is a zero value.

7. The method of claim 3 wherein said default program set includes not more than one default time value, and not more than one default temperature value for each of a heating and cooling operation.

8. The method of claim 7 wherein the altering of the default program set includes the steps of displaying the default time and temperature values for a plurality of time periods and then altering or selecting the displayed default time and temperature values for one or more of the plurality of time periods on a consecutive time period by time period basis.

9. The method of claim 7 wherein said not more than one default time value is a zero value and wherein the step of altering the default program set includes the step of loading the pre-programmed program set from the long-term memory to replace the default program set in the working memory.

10. The method of claim 1 wherein said step of altering the times and temperatures of the selected pre-programmed program set within the working memory takes place without altering the selected pre-programmed program set within the long-term memory.

11. The method of claim 10 wherein said long-term memory is a read-only memory.

12. An auto-programmable thermostat comprising:

a first memory having a default program set stored therein and which receives at least a selected one of one or more pre-programmed program sets, wherein each pre-programmed program set comprises a plurality of times and a plurality of temperatures;

a second memory for storing one or more pre-programmed program sets, each of which comprises a plurality of times and a plurality of temperatures;

a plurality of alphanumeric identifiers, each identifier corresponding to one of the one or more pre-programmed program sets;

selection means for selecting one of a plurality of the alphanumeric identifiers;

means responsive to the selection means for replacing the default program set in the first memory with the selected pre-programmed program set from the second memory; and means for altering the times and temperatures of the selected pre-programmed program set within said first memory and retaining the selected pre-programmed set within said second memory without alteration.

13. The thermostat of claim 12, wherein the default program set is loaded from said second memory to said first memory upon first application of power to the thermostat.

14. An auto-programmable thermostat comprising:
a first memory having a default program set stored therein and which receives and stores one of at least one pre-programmed program set, wherein said pre-programmed program set comprises a plurality of times and at least one set of a corresponding number of temperatures;
selection means for selecting one of the at least one pre-programmed program set;
means responsive to the selection means for replacing the default program set with the times and temperatures of the selected pre-programmed program set in the first memory; and
means for altering the times and temperatures of the selected pre-programmed program set within said first memory to create a tailored program set within said first memory which remains within said first memory until further alteration.

15. The thermostat of claim 14, further comprising a second memory and wherein the default program set is loaded from said second memory and stored in the first memory upon first application of power to the thermostat.

16. The thermostat of claim 15 further comprising means for altering the default program set within said first memory.

17. The thermostat of claim 16 wherein said default program set include a zero time value, a first plurality of temperatures for controlling a heating operation, and a second plurality of temperatures for controlling a cooling operation.

18. The thermostat of claim 16 wherein said default program set includes a zero time value, a first temperature for controlling a heating operation, a second temperature for controlling a cooling operation, means for displaying the zero time value and one of said first and second temperatures for each of a plurality of time periods, and means for altering the zero time value to an actual time value, and for altering said one of said first and second temperatures, for each of the plurality of time periods.

19. The thermostat of claim 18 wherein said pre-programmed program set is stored within said second memory and is loadable into said first memory in response to said selection means.

20. The thermostat of claim 6 wherein said first memory is a working memory and said second memory is a long-term memory.

21. The programmable thermostat of claim 14, wherein the selected pre-programmed program set comprises a plurality of times and a corresponding plurality of temperatures and the thermostat further comprises a second memory means for storing at least one standard program set having a plurality of times and at least a corresponding plurality of temperatures and wherein the plurality of times of the selected program set has a predetermined relationship with respect to the plurality of times of the standard program set.

22. The programmable thermostat of claim 14, further comprising a second memory for storing a plurality of pre-programmed program sets and wherein the selection means is used to select one of the plurality of pre-programmed program sets stored in the second memory.

23. The programmable thermostat of claim 14, wherein each pre-programmed program set comprises a plurality of times and a first corresponding plurality of temperatures and a second corresponding plurality of temperatures.

24. The programmable thermostat of claim 23, wherein the first plurality of temperatures are temperatures for controlling a heating system.

25. The programmable thermostat of claim 24, wherein the second plurality to temperatures are temperatures for controlling a cooling system.

26. An auto-programmable thermostat comprising:
a first memory having a default program set which is programmable;
a second memory for storing a plurality of pre-programmed program sets, where each pre-programmed program set comprises a plurality of times and at least a corresponding number of temperatures;
selection means for selecting one of the stored pre-programmed program sets;
means responsive to the selection means for loading the times and corresponding temperatures of the selected pre-programmed program set from said second memory into said first memory to replace the default program set; and
means for altering the times and temperatures of the selected pre-programmed program set within said first memory.

27. The thermostat of claim 26, wherein the default program set is loaded from a second memory to the first memory upon first application of power to the thermostat.

28. An auto-programmable thermostat comprising:
a first memory which is programmable and has a default program set;
a second memory for storing at least one standard program set, wherein the standard program set comprises a plurality of times and at least a corresponding number of temperatures;
selection means for selecting a program set for loading in the first memory, wherein at least one of the times and temperatures of the selected program set has a predetermined relationship with the time and temperatures of the standard pre-programmed program set within said second memory, so that the selected program set is derived from the standard pre-programmed program set;
means responsive to the selection means for replacing the default program set in the first memory with the times and temperatures of the selected program set; and
means for altering the times and temperatures of the selected program set within said first memory.

29. The thermostat of claim 28, wherein the default program set is loaded from a second memory to the first memory upon first application of power to the thermostat.

30. The programmable thermostat of claim 28, wherein the second memory comprises a plurality of standard program sets, and wherein the selection means further comprises means for selecting one of the plurality of standard program sets and wherein the selected program set is derived from the selected standard program set.

31. The programmable thermostat of claim 28 wherein each program set comprises a plurality of times and a first corresponding plurality of temperatures and a second corresponding plurality of temperatures.

32. The programmable thermostat of claim 31, wherein the first plurality of temperatures is used for controlling a heating system.

33. The programmable thermostat of claim 31, wherein the second plurality of temperatures is used for controlling a cooling system.

34. A programmable thermostat comprising:

a long-term memory having a default program set stored therein, said default program set including not more than one time value and not more than one temperature value for each of a heating and cooling operation, and further having a pre-programmed program set stored therein, said pre-programmed program set including a plurality of times and a plurality of corresponding temperatures for each of a heating and cooling operation;

a working memory for automatically receiving and storing the default program set from said long-term memory upon initial power-up of the thermostat whereby the thermostat is initially programmed to be set at said one temperature value for each of said heating and cooling operations, and for receiving and storing said pre-programmed program set from said long-term memory whereby the thermostat is programmed to be set in accordance with said plurality of times and temperatures for each of a heating and cooling operation;

means for displaying the default program set stored within said working memory for a plurality of time periods;

means for altering the displayed default program set stored within said working memory for each of said plurality of time periods to set one or more of the time and temperature values so that the thermostat is programmed to operate at the set time and temperature values;

means for selecting said pre-programmed program set within long-term memory and, responsive to said selecting means, loading the pre-programmed program set into said working memory to replace the program set then residing in said working memory; and means for altering the selected pre-programmed program set within said working memory to change one or more of the pre-programmed time and temperature values.

35. The programmable thermostat of claim 34 wherein said not more than one time value of said default program set is a zero value.

36. A method of programming a programmable thermostat having a display, a long-term memory, and a working memory, and including a default program set and a pre-programmed program set, each of which are stored in the long-term memory and loadable into the working memory, wherein the default program set includes not more than one time value, and not more than one temperature value for each of a heating and cooling operation, and wherein the pre-programmed program set includes a plurality of starting time values and a plurality of set-point temperature values corresponding to the starting times for each of a heating and cooling operation, the method comprising the steps of:

initializing the thermostat by applying power to the thermostat;

automatically loading the default program set from the long-term memory to the working memory upon initializing the thermostat whereby the thermostat is initially programmed to be set at the default temperature value for one of the heating and cooling operations;

displaying the not more than one time and temperature values of the default program set for each of a plurality of time periods;

altering the default program set by at least one of the following steps (a) selecting a time value and a temperature value for the not more than one time value and not more than one temperature value of the displayed default program set for at least one of said plurality of time periods on a time period by time period basis;

(b) selecting the pre-programmed program set from long-term memory and, in response thereto, loading the entire pre-programmed program set into said working memory in place of the default program set;

altering a program set that resides within working memory by at least one of the following steps (c) changing one or more of the time and temperature values that resides within working memory for one or more of the time periods;

(d) loading the entire pre-programmed program set from long-term memory into said working memory to replace the program set within working memory.

37. The method of claim 36 wherein said not more than one time value of said default program set is a zero value.

* * * * *